US009235252B2

(12) United States Patent
Shrall et al.

(10) Patent No.: US 9,235,252 B2
(45) Date of Patent: Jan. 12, 2016

(54) DYNAMIC BALANCING OF POWER ACROSS A PLURALITY OF PROCESSOR DOMAINS ACCORDING TO POWER POLICY CONTROL BIAS

(71) Applicant: Intel Corporation, Santa Clara, CA (US)

(72) Inventors: Jeremy J. Shrall, Portland, OR (US); Jay D. Schwartz, Aloha, OR (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 13/724,798

(22) Filed: Dec. 21, 2012

(65) Prior Publication Data

US 2014/0181545 A1    Jun. 26, 2014

(51) Int. Cl.
*G06F 1/32*    (2006.01)

(52) U.S. Cl.
CPC .............. *G06F 1/3206* (2013.01); *G06F 1/324* (2013.01); *Y02B 60/1217* (2013.01)

(58) Field of Classification Search
CPC .... G06F 1/3206; G06F 1/324; Y02B 60/1217
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,117 B2 | 9/2006 | Franklin et al. | |
| 7,194,643 B2 | 3/2007 | Gonzalez et al. | |
| 7,272,730 B1 | 9/2007 | Acquaviva et al. | |

(Continued)

FOREIGN PATENT DOCUMENTS

EP    1 282 030 A1    5/2003

OTHER PUBLICATIONS

Microsoft Computer Dictionary. Redmond, WA: Microsoft, 2002. 73.*

(Continued)

*Primary Examiner* — Jaweed A Abbaszadeh
*Assistant Examiner* — Brian J Corcoran
(74) *Attorney, Agent, or Firm* — Trop, Pruner & Hu, P.C.

(57) ABSTRACT

In an embodiment, a processor includes multiple domains including a core domain having at least one core to execute instructions and a graphics domain including at least one graphics engine to perform graphics operations and a power controller to control power consumption of the processor. The power controller may include a logic to receive an indication of a priority domain of the domains and to dynamically allocate power to the domains based on a power limit, one or more maximum domain frequency requests, and the priority domain indication. Other embodiments are described and claimed.

18 Claims, 6 Drawing Sheets

(56) References Cited

U.S. PATENT DOCUMENTS

| | | | |
|---|---|---|---|
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0178019 A1* | 7/2008 | McGrane et al. | 713/320 |
| 2008/0250260 A1 | 10/2008 | Tomita | |
| 2008/0263373 A1* | 10/2008 | Meier et al. | 713/300 |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0144818 A1 | 6/2011 | Li et al. | |
| 2011/0154090 A1 | 6/2011 | Dixon et al. | |
| 2012/0079290 A1 | 3/2012 | Kumar | |
| 2012/0137158 A1 | 5/2012 | Nelluri et al. | |
| 2012/0173895 A1 | 7/2012 | Kim et al. | |
| 2012/0185706 A1 | 7/2012 | Sistla et al. | |
| 2012/0246506 A1 | 9/2012 | Knight | |
| 2012/0324248 A1 | 12/2012 | Schluessler et al. | |
| 2014/0149753 A1* | 5/2014 | Park et al. | 713/300 |

OTHER PUBLICATIONS

International Searching Authority, "Notification of Transmittal of the International Search Report and the Written Opinion of the International Searching Authority," mailed Oct. 24, 2013, in International application No. PCT/US2013/048391.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State ", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

* cited by examiner

DYNAMIC BALANCING OF POWER ACROSS A PLURALITY OF PROCESSOR DOMAINS ACCORDING TO POWER POLICY CONTROL BIAS

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In a computer platform, both a processor's voltage regulator and a platform power supply have peak instantaneous power delivery constraints to be managed in order to ensure stable operation. In some systems, each individual voltage regulator is sized for peak power consumption of individual voltage rails such as processor cores and graphics engines. Similarly, the platform power supply is sized for the peak power demand of the sum of all voltage rails. Yet sizing the input power delivery system (including platform power supply) to supply the sum of peak power on all voltage rails is a significant over-design of real peak power demand during real workload operation.

However, allocating power to individual rails using a fixed allocation scheme can result in significant performance losses as workload power delivery demand on each rail shifts. Furthermore, on a processor with a single input voltage rail and several on-die integrated voltage rails, there is not an easy option to manage allocation of peak power to each of the on-die voltage rails.

DETAILED DESCRIPTION

In various embodiments, run-time, demand-based and instantaneous power allocation can be controlled within a multi-domain processor. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although the scope of the present invention is not limited in this regard, representative domains or power planes may include a core domain, a graphics domain, a cache domain, a memory domain where a processor package includes an embedded memory such as an embedded dynamic random access memory (eDRAM), an interconnect domain and a system agent domain. Although many implementations of a multi-domain processor can be formed on a single semiconductor die, other implementations can be realized by a multi-chip package in which different domains can be present on different semiconductor die of a single package.

Various components may be integrated to optimally apply power allocation within the processor, in an embodiment. These components include a run-time configurable peak power control interface for each managed power plane, calculation techniques for assessing the performance demand assessment from peak power requirements at various performance levels using performance demand and peak power levels, and a low latency power allocation scheme.

A peak power control interface may be provided to manage a peak power constraint, which is a power consumption limit that the processor is not to exceed. In an embodiment, this constraint may be managed by software (such as a basic input/output system (BIOS) or other supervisor software) by writing a peak power constraint into a configuration register. In one embodiment, this register may be a model specific register (MSR), and the constraint may be in terms of a maximum current, referred to herein as a $I_{CCMAX}$ limit. As such in this embodiment, the interface is managed as a maximum current draw limit in units of amperes. In other embodiments, a different parameter may be used to implement the peak power constraint in units of Watts or another unit of measure.

When an update to the peak power limit occurs, the processor responds by clamping power to the identified level within a minimum response latency. Note the platform power delivery solution is designed to provision for this worst-case latency.

Various components may be involved in performance demand assessment and allocation. In an embodiment, the components to be assessed in determining performance demand include: a maximum domain frequency request from the operating system (OS) or driver (namely a software frequency request); bias controls, which in an embodiment may be software-controlled to describe where to allocate or steer power when all power planes are constrained below a maximum software frequency request; and heuristics for assessing the impact of frequency for each controlled power plane.

In an embodiment, the bias controls or knobs may be received directly from the operating system, a graphics driver or other software entity. This bias information may be stored in a control register or other storage. In an embodiment, this register may include a plurality of fields each to identify a domain having a particular priority. For example, a first field indicates the highest priority domain, a second field indicates the second highest priority domain, and so forth. In another embodiment, a single field may be provided to indicate the high priority domain only. In some embodiments, platform level entities such as one or more embedded controllers may provide additional input into the allocation scheme, based on platform level performance demand.

Note that if a maximum frequency request from software or driver can be satisfied under a current peak power constraint, there is no need to assess a domain's demand for power. However, if the sum of power demand from all processor rails exceeds the indicated limit in the peak power control interface, an embodiment may operate to intelligently allocate power among all domains. In one embodiment, the technique for allocation is as follows: allocate sufficient power to all domains to ensure operation at a minimum power level, and then beginning with the prioritized domain, allocate some or all of the remaining package power budget to that domain (while ensuring that this budget does not exceed the power level associated with the maximum software request).

This maximum software request may be modulated by other algorithms that use heuristics to determine how much benefit a particular domain will realize from additional frequency. For example, one such heuristic is analysis of a bias value that indicates a preference (e.g., of a software entity) for allocation of power to a core domain and a graphics domain. In an embodiment this bias value can be stored in a configuration storage accessible to a power controller. In operation, this analysis may modulate lower a maximum operating frequency determined for a core domain when the bias value indicates a performance for the graphics domain. If the software frequency request is modulated downward responsive to heuristics, additional power is freed for other domains. Finally, after considering the priority domain, the remaining power budget at the package level may be allocated to remaining domains.

In different embodiments, different analyses and supporting calculations may be used to determine peak power demand. In order to minimize guard bands in calculation of peak power demand for a given power plane, the components of power demand are segmented into as many logical blocks as possible. For example, if a compute block is active at a low level versus a high level, or not active at all, an appropriate power cost is charged to that domain. These compute blocks (which may be at the core or processing engine level, or at an even finer level such as particular execution logics) may include functionality to detect a change in workload that corresponds to a different activity level. In this way, the peak power demand does not change without first re-evaluating the package level power allocation. The power demand calculation sums the demand of all of the compute blocks within a power plane to assess the net power demand at a given maximum clock frequency, in an embodiment.

Note that compute blocks may have frequent changes in total demand and thus an allocation solution can be managed in the critical path of those transitions. Transitions can be events such as compute blocks waking or going to sleep, and they can also be changes in workload instruction mixes, such as light (e.g., integer) operations to heavy (e.g., vector math) operations. In an embodiment, calculation latency is minimized by managing information in one or more maximum power demand tables (also referred to herein as power cost tables or power allocation tables), which includes entries that identify all of the variables that may change during run-time. These tables may include the following, for all possible clock frequency and voltage combinations of each power plane: leakage power and dynamic power. In an embodiment, each entry of this table may include fields to store leakage power and two dynamic power values, namely a peak power consumption level for a given frequency of operation (corresponding to a peak virus activity level) and a non-peak power consumption level. In an embodiment there may be a table for each compute domain. These tables may be further sub-divided in such a way to simplify power calculations. For example, for core domains a base power cost table and a peak power cost table may be provided, and for a graphics domain, a single table may be provided.

In an embodiment, these power demand tables may include an entry, for each domain and given frequency and voltage, that stores the leakage power level and dynamic power levels (at roughly the current operating temperature of the processor). These tables may be infrequently updated in the background, in some embodiments with an update rate faster than changes in temperature, which can result in changes to both leakage power and dynamic power. Such table, e.g., of leakages and dynamic power, can be quickly added to calculate the cost of a certain performance level. In this way, power delivery demand at a given performance level can be calculated quickly so that the binary search may complete in a very short amount of time on a low performing processor such as a PCU.

In addition to leakage and dynamic power assessments, some domain level power demand may come from power delivery losses on-die such as losses in an integrated voltage regulator. These losses are a function of total output load, and power loss calculations are handled in the critical path, upon detection of a change in domain level demand or package level power constraints. While one implementation can be used to control cores, graphics, and last level cache, embodiments scale to N domains. For example, an embedded memory (e.g., an eDRAM) may be included in the power balancing scheme. Similarly embodiments may extend out to the entire system, and used to balance current across all domains supplied by a battery. The biasing inputs are two-fold: (1) software requests for peak performance, which include frequency request (in the case of cores, graphics, last level cache) or on/off request (in the case of a fixed frequency domain like eDRAM); and micro-architectural counters and other heuristics for fine-tuning the software request. For example, software may enable eDRAM, but micro-architectural counters may be used to determine it is not being utilized and therefore to safely remove it and rebalance its power.

Figure 1:
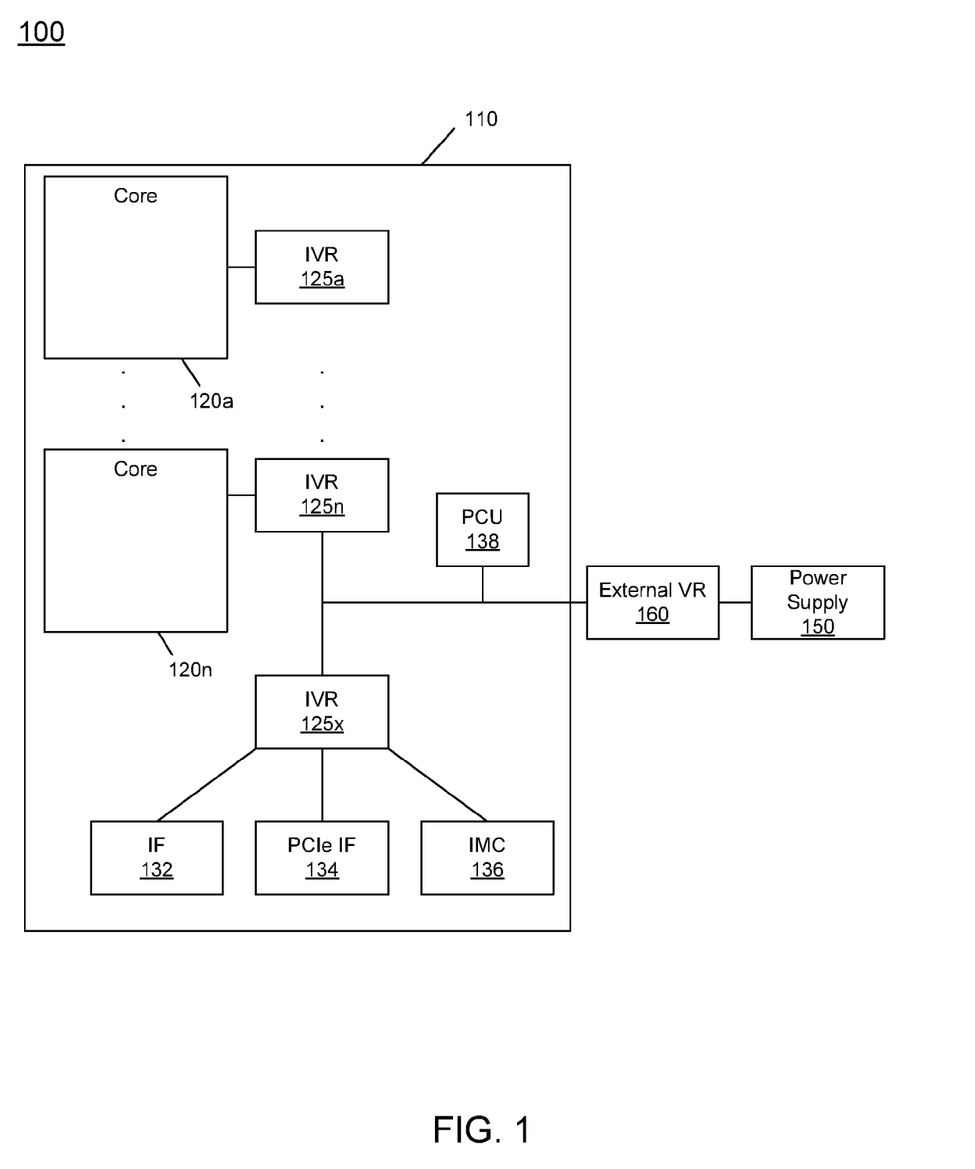
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores 120*a*-120*n*. In addition, each core may be associated with an individual voltage regulator 125*a*-125*n*. Accordingly, an integrated voltage regulator allows for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125*x*. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic such as power allocation logic to perform dynamic real-time peak power delivery control and demand-based allocation to different domains of the processor in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 110 such as additional uncore logic and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the peak power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
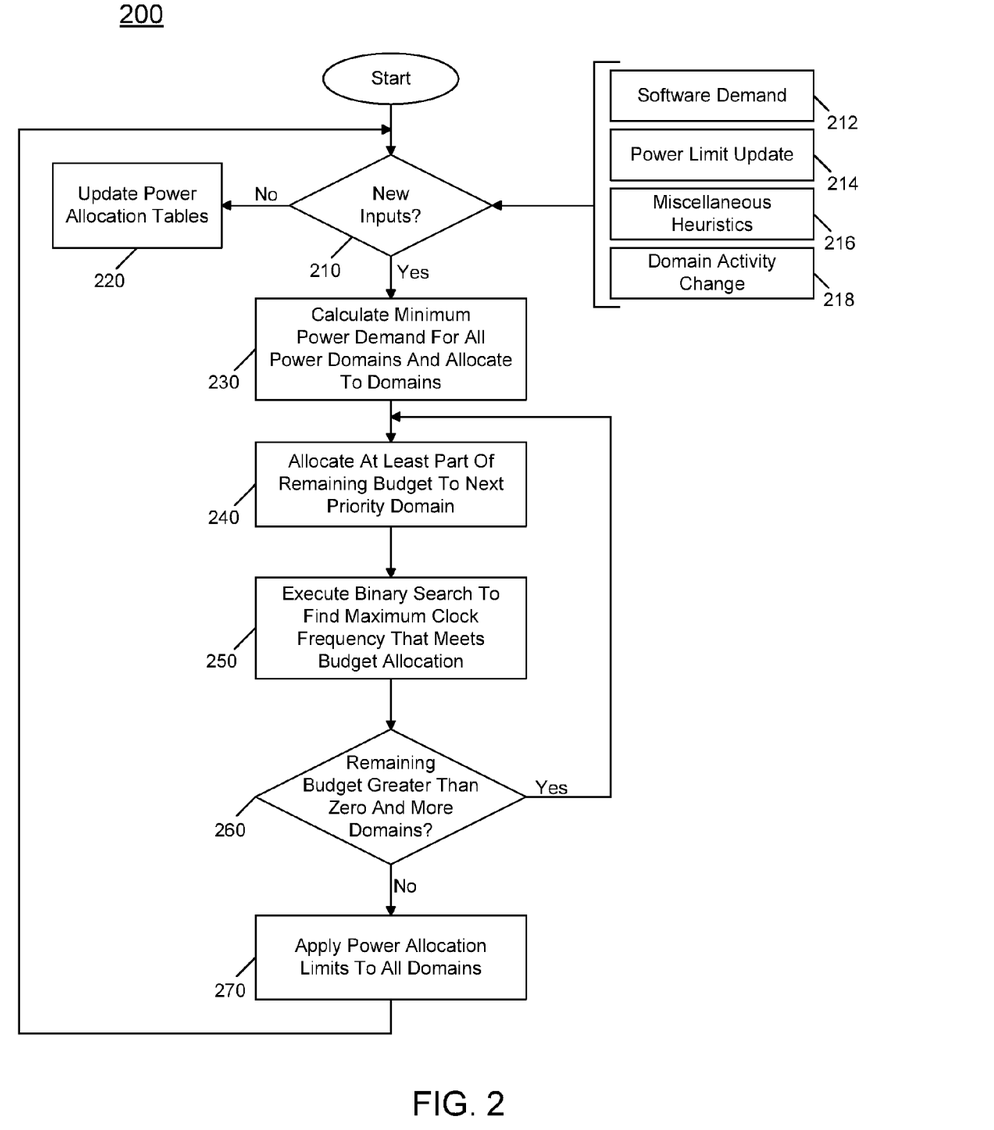
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 can be implemented by power allocation control logic, which may be a standalone logic of a processor or implemented within a PCU. As seen, method 200 begins by determining whether any new inputs have been received into this logic (diamond 210). As examples, various inputs can include software demand inputs 212, power limit update inputs 214, heuristic inputs 216, and domain activity update inputs 218.

Each of these inputs is described in turn. Software demand inputs 212 may be from a supervisor software such as an OS or other control entity that seeks a given performance level of the processor, e.g., according to a given ACPI P-state. Stated another way, these software demand inputs can correspond to requests for a given operating frequency. In an embodiment, these software demand inputs may be provided per domain of the processor and may correspond to a maximum frequency request by the software. Power limit update input 214 may be provided upon a change to a power limit of the processor, which can be in terms of a maximum current and may be received from a configuration register, namely a maximum power draw configuration register. Dynamic power limits can come from multiple constraints, e.g., there may be a voltage regulator peak current delivery constraint, a battery peak discharge rate constraint, a power delivery duty cycle constraint from the power supply, among others. This update may be made by a software entity in response to a device being plugged into universal serial bus (USB) or a battery discharge level, for example. Heuristic inputs 216 may correspond to various policy decision inputs to indicate whether a particular application or other workload benefits from increased power. These heuristics may be taken into account to help determine whether a requested frequency (or a given domain should be allowed to occur), in that if no greater performance benefit is achieved by operation according to this greater frequency request, no corresponding benefit is obtained for the increase in power consumption and instead operation may benefit from applying such additional power capacity to another domain. One such heuristic input is a bias value, as described above. Finally, a domain activity change input 218 may provide information regarding changes in a domain's activity level. These updates may occur, for example, in a core domain when a given core enters an active state, enters a sleep state or a mix of instructions being executed on the core causes higher (or lower) power consumption. In an embodiment, OS requests for given C-states may act as a proxy for these inputs.

Still referring to FIG. 2, if it is determined that no new inputs are received, control passes to block 220 where in the background power allocation tables may be updated. Such updates to the tables may provide updated information regarding peak power consumption for a given frequency, as power consumption and leakage power both can vary as temperature of the processor varies. Note that in some embodiments, these background updates occur only when a temperature change of at least a threshold amount has occurred.

Still referring to FIG. 2, if instead it is determined that one or more new inputs are received, control passes to block 230 where a minimum power demand can be calculated for each of the domains of the processor and this minimum power allocation may be performed. This minimum power demand may be determined by calculating a power level for each domain, assuming that the domain is to operate at a minimum performance value (e.g., referred to as Pn), which may be a value obtained from a configuration register such as from a manufacturing fuse configuration. In addition to this minimum power demand determination (and possibly as a first analysis), the estimated power demand for achieving operation at the requested performance level for all domains can be determined. If this requested performance level power demand is less than the power available, e.g., according to a power budget, there is no constraint and no further analysis is performed (and thus method 200 may conclude for the current iteration).

Otherwise if a constraint is identified, control passes to block 240 where at least part of a remaining budget can be allocated to a next priority domain. For example, on an initial pass, the highest priority domain, e.g., as indicated by the value in the bias configuration register can be identified and all or a portion of the remaining power budget can be allocated to this priority domain. Control then passes to block 250 where a binary search algorithm may be executed to determine a maximum clock frequency for this allocated power budget. By using a binary search bounded by the minimum and maximum frequency values for the domain, a relatively low latency determination of an appropriate frequency can be determined. Next, control passes to diamond 260 to determine whether any remaining budget exists and whether one or more domains remain to be analyzed. If the combined answer is yes, control passes back to block 240 above. Otherwise the analysis may conclude and control passes to block 270, where any updated power limits can be applied to the domains. In an embodiment, a limit configuration register or a so-called clip register may store these values which may correspond to a maximum permitted frequency (which may be set to values lower than configured maximum operating frequency values). Accordingly, these values may be used to clip a requested frequency received from a given software entity to thus maintain an appropriate power level for the processor. Although shown at this high level in the embodiment of FIG. 2, understand the scope of the present invention is not limited in this regard.

In another embodiment, the binary search across the various domains is not serialized. Instead a single binary search can be enabled with the pivot as the priority domain, and at each calculation point, a performance demand established for all associated domains. For example, if the graphics engine is the pivot, heuristics and software bias information can be used to establish rules for cores, last level cache, and eDRAM control as a function of graphics frequency. As the binary search is executed to find the ideal frequency for graphics, an instant calculation of the demand for performance of those domains can occur. This approach may lower guard bands.

Note that the PCU may act as is a single governing entity for on/off/performance level transitions. This ensures serializing of the wakeup and shutdown process, always ensuring that operation is at or below peak power delivery capabilities. For example, before a core is woken, first a lower frequency on other core(s) or shut down a non-critical domain may occur in order to allocate enough power to wake the core. On the flip side, when a core is shut down, shutdown completion may occur before recovering the power saved.

Figure 3:
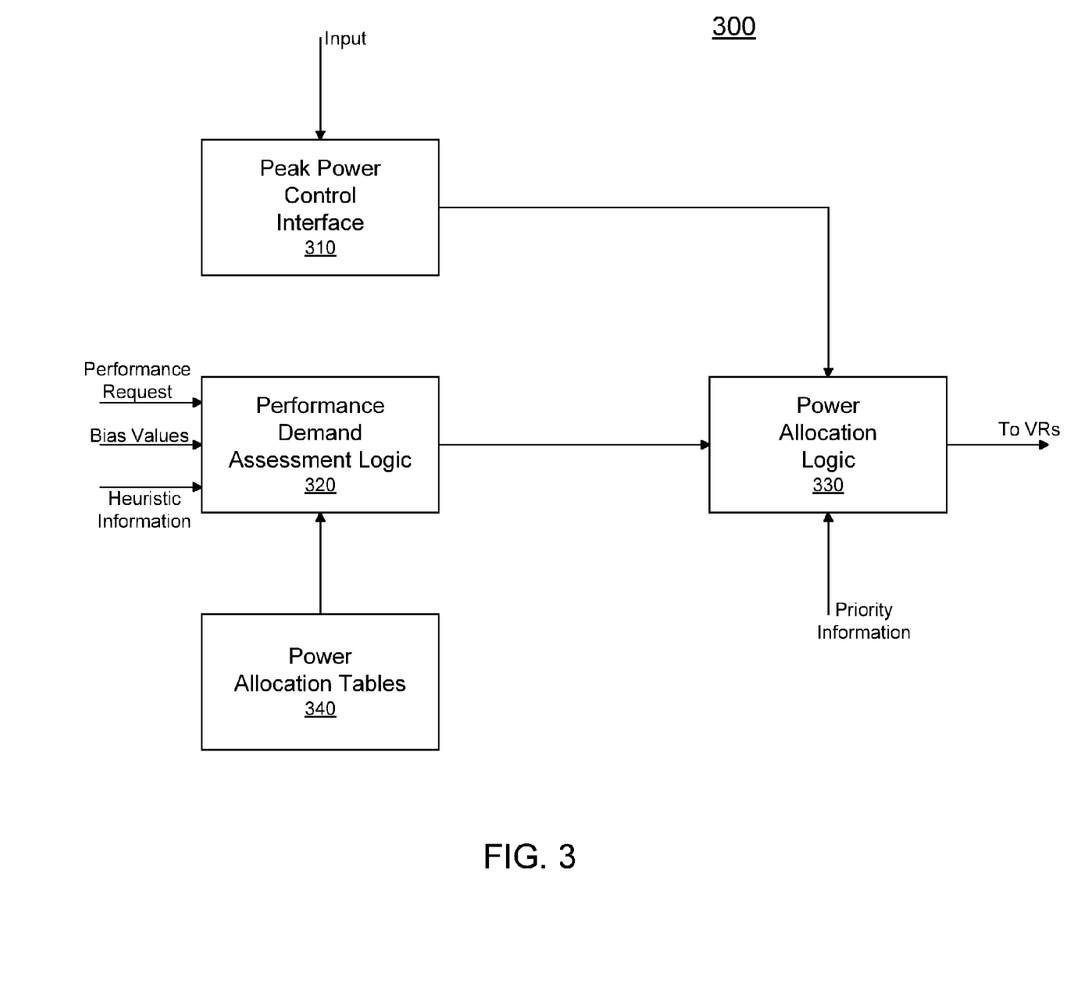
FIG. 3 is a block diagram illustrating a power allocation logic in accordance with an embodiment of the present invention.

Referring now to FIG. 3, shown is a block diagram illustrating a power allocation logic in accordance with an embodiment of the present invention. As shown in FIG. 3, power allocation logic 300 includes various components that may be used to perform real-time peak power delivery control and demand-based allocation of power to various domains of a multi-domain processor in accordance with an embodiment of the present invention. Logic 300 includes components to receive inputs from different entities, determine a performance demand for various domains of the processor and to allocate power to these domains based on the determined demands and additional information such as priority information.

A peak power control interface 310 is configured to receive an input which in an embodiment may be received from a software entity and which provides a peak power constraint for the processor. In an embodiment, interface 310 includes a configuration register to store this value and to further provide it to a power allocation logic 330, described further below.

Logic 300 further includes a performance demand assessment logic 320 that receives various inputs from different entities as well as power demand information from a set of power allocation tables 340. The inputs provided to logic 320 include a performance request for each of the various domains, which can be received from an appropriate entity such as an OS, graphics driver or so forth. In addition, one or more bias values can be provided to indicate a bias of power delivery to one or more of the domains. Still further, heuristic information may further be provided. Based on all of this information, logic 320 determines a power demand at particular operating levels for each of the domains, and provides this information to power allocation logic 330. As seen, power allocation logic 330 further receives priority information which may be an indication of the priority of domains with regard to operating priority. In an embodiment, this information can be received from a configuration register as described above. In addition, via interface 310, the maximum power draw is also received. Based on this information, power allocation logic 330 thus allocates the available power budget amongst the different domains and provides the allocated power values for each of the domains to corresponding voltage regulators that power the domains. In an embodiment, a current value may be communicated as the allocated power value to the domains. Although shown at this high level in the embodiment of FIG. 3, understand the scope of the present invention is not limited in this regard.

Referring now to Table 1, shown is example pseudocode in accordance with an embodiment of the present invention for calculating power demand for a desired frequency 'f'.

TABLE 1

```
def calculate_power_demand(f):
    leaking_count = 0
    peak_active_count = 0
    normal_active_count = 0
    for i in range(1 to N):
        if (core[i].demand == peak):
            peak_active_count += 1
        elif (core[i].demand == normal):
            normal_active_count += 1
        elif (core[i].demand == leakage):
            leaking_count += 1
    power_demand = 0
    power_demand += (leakage_power[f] + efficiency_loss) *
    leaking_count
```

TABLE 1-continued

```
    power_demand += (leakage_power[f] + dynamic_power[f] +
        efficiency_loss) * peak_active_count
    power_demand += (leakage_power[f] + dynamic_power[f] *
        normal_app_ratio + efficiency_loss) *
        normal_active_count
return power_demand
```

As seen in Table 1, an algorithm is thus provided to calculate power demand for a given frequency. First a set of counters are initialized to zero. These counters include a first counter to count the number of cores in a low power state (corresponding to a leakage count), a second counter to count the number of cores in a peak active state (corresponding to a power virus condition of a core), and a third counter to count the number of cores in a normal active state (corresponding to a non-power virus condition). Then a loop is performed for each core to identify the activity level of the core and allocate that core to one of these different counters.

Next a power demand calculation is performed that determines individually the power demand for each of these different activity levels. Thus for the cores in a low power state the power demand corresponds to the leakage power for the given frequency at which the core is operating along with an efficiency loss value, which may correspond to various power losses within the core such as associated with the integrated voltage regulator. For the cores operating at a power virus level, the power demand can be calculated based on both the leakage power level and the dynamic power level (corresponding to the power virus condition) along with the associated efficiency loss as discussed above. Finally for cores operating at a non-power virus level, the power demand is calculated. Then the resulting power demand for each of these different core activity levels can be summed to obtain a power demand that can be used in further analysis of power allocation in accordance with an embodiment of the present invention. Although this implementation uses leakage, active and peak active levels for the performance levels, in other embodiments a more generic "N" levels of power may be applicable to an application or target market. For example, a server product may have a different policy for calculation than a client mobile product since priorities are generally different in the market segments.

Thus using an algorithm such as in FIG. 2, power allocation logic, upon changes in peak power constraints, software biasing, or compute block activity states, can re-evaluate and balance power demands according to an updated software request. To execute this balancing, the binary search scheme bounded by maximum frequency and minimum frequency is used to find the maximum frequency that may be supported at the power plane level, in an embodiment. The search scheme first satisfies the priority domain according to the software request (or as much as is possible given the programmed package power limits). Any remainder of available package power after this priority domain is handled can then allocated to the remaining domains in priority order, and each using a binary search. The binary search scheme ensures that no more than six calculations occur per evaluation, in an embodiment.

Accordingly, the final output result of the power allocation scheme is a maximum supported clock frequency for each power plane. This maximum frequency may act as a limit to be used as an upper clip to a frequency requested by software. In turn, the power allocation logic (such as of the PCU) may be configured to respond with very low latency to requests for additional compute domains to wake from an idle state to an active state and thus incur a minimal impact to idle-state exit latencies, which can directly impact performance.

In some embodiments, a feedback control technique may be provided to enable detection of scenarios where the processor is persistently limited by maximum power delivery constraints. Responsive to detection of this condition, the processor may cause a shift in clock frequency requests according to various heuristics. To this end, status and sticky log bits may be provided to indicate the occurrence of domain-level maximum clock frequency clipping as a result of package peak power delivery constraints. This information may then be used to enable a shift in clock frequency requests, meaning that software will start lowering frequency requests on the priority domain if it is starved for resources because of another non-priority domain being clamped. Thus in various embodiments, a computing device may maximize performance under a limited power delivery budget.

Figure 4:
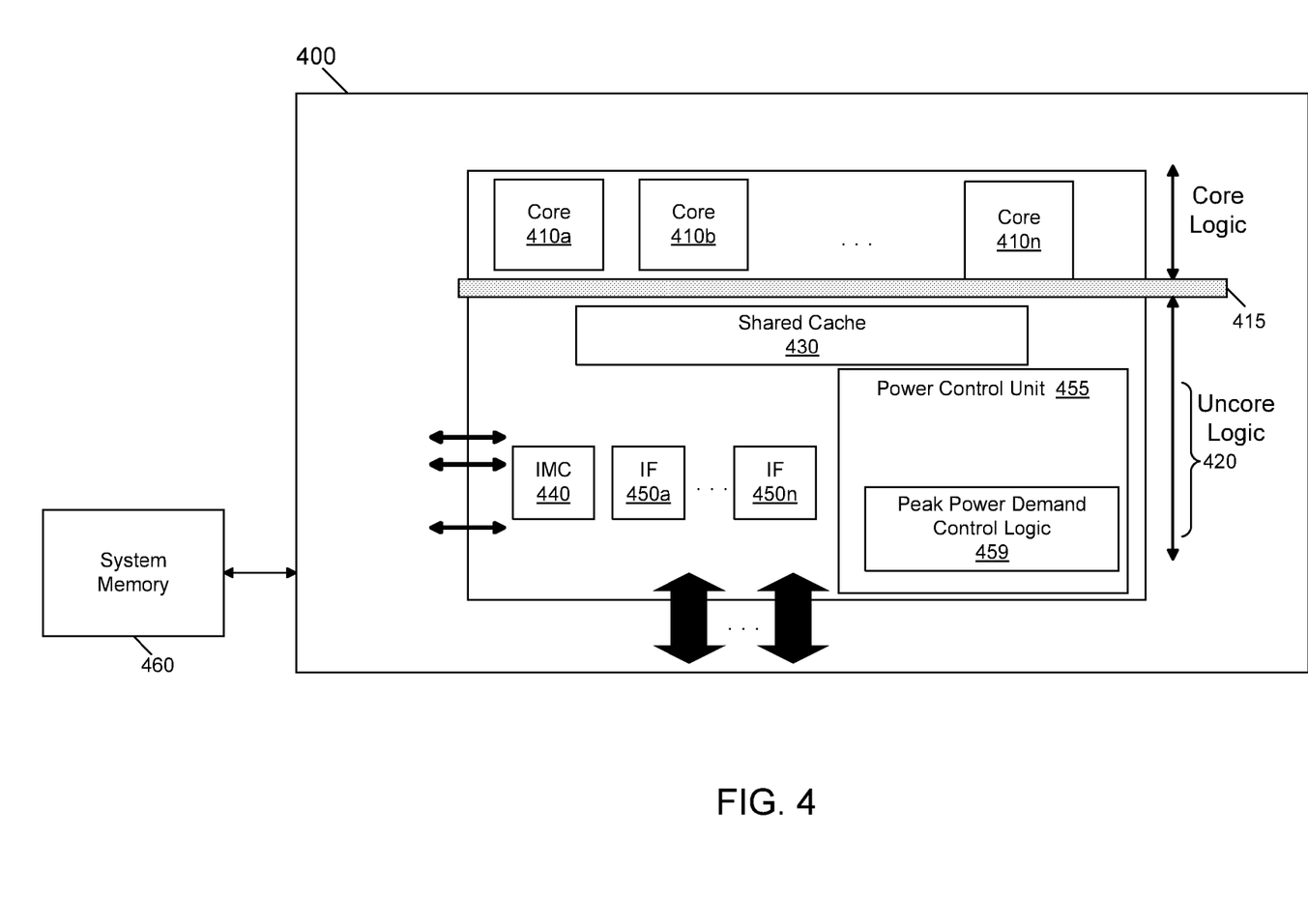
FIG. 4 is a block diagram of a processor in accordance with an embodiment of the present invention.

Embodiments can be implemented in processors for various markets including server processors, desktop processors, mobile processors and so forth. Referring now to FIG. 4, shown is a block diagram of a processor in accordance with an embodiment of the present invention. As shown in FIG. 4, processor 400 may be a multicore processor including a plurality of cores $410a$-$410n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a peak power demand control logic 459 in accordance with an embodiment of the present invention. As described above, this logic acts to receive various inputs and allocate an available power budget across the multiple domains, based at least in part on a priority domain and information regarding power consumption at a temperature at which the processor is operating.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
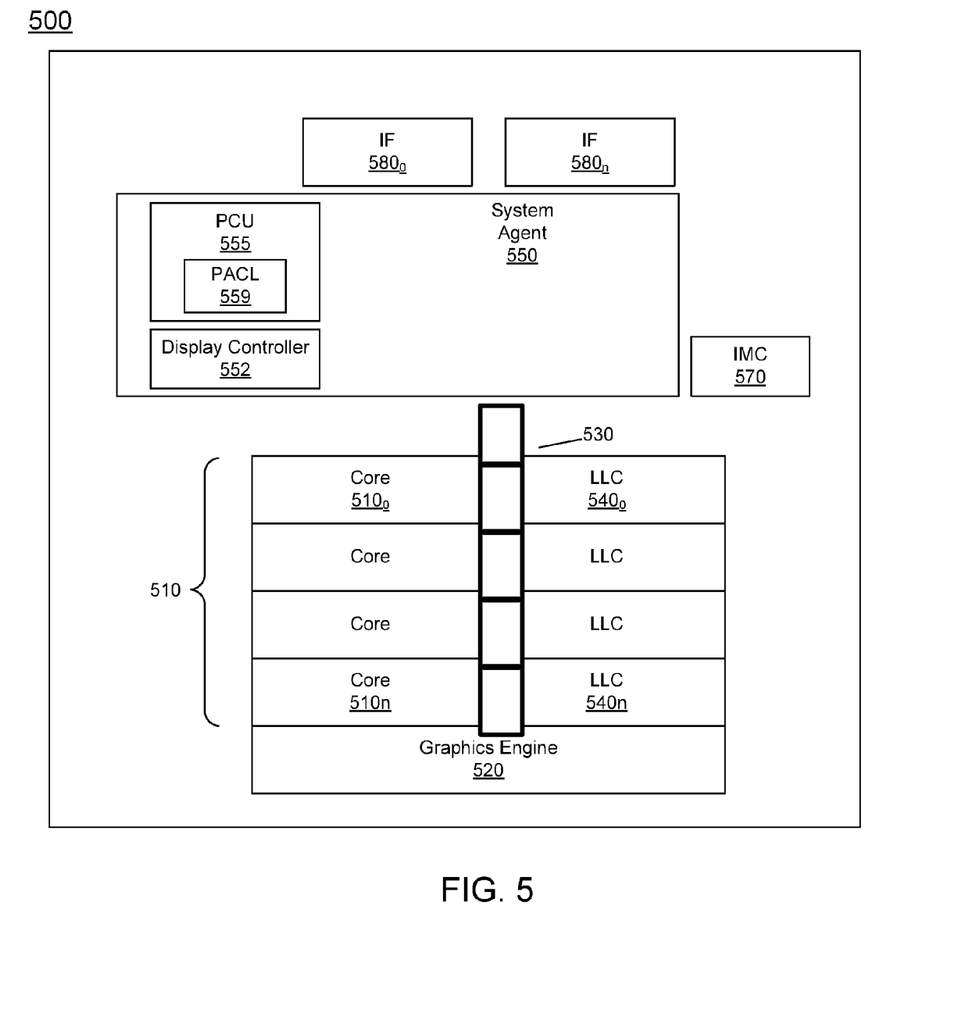
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a power allocation control logic 559 in accordance with an embodiment of the present invention to enable dynamic power delivery control and demand-based allocation as described herein. In various embodiments, this logic may execute the algorithm described above in FIG. 2.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
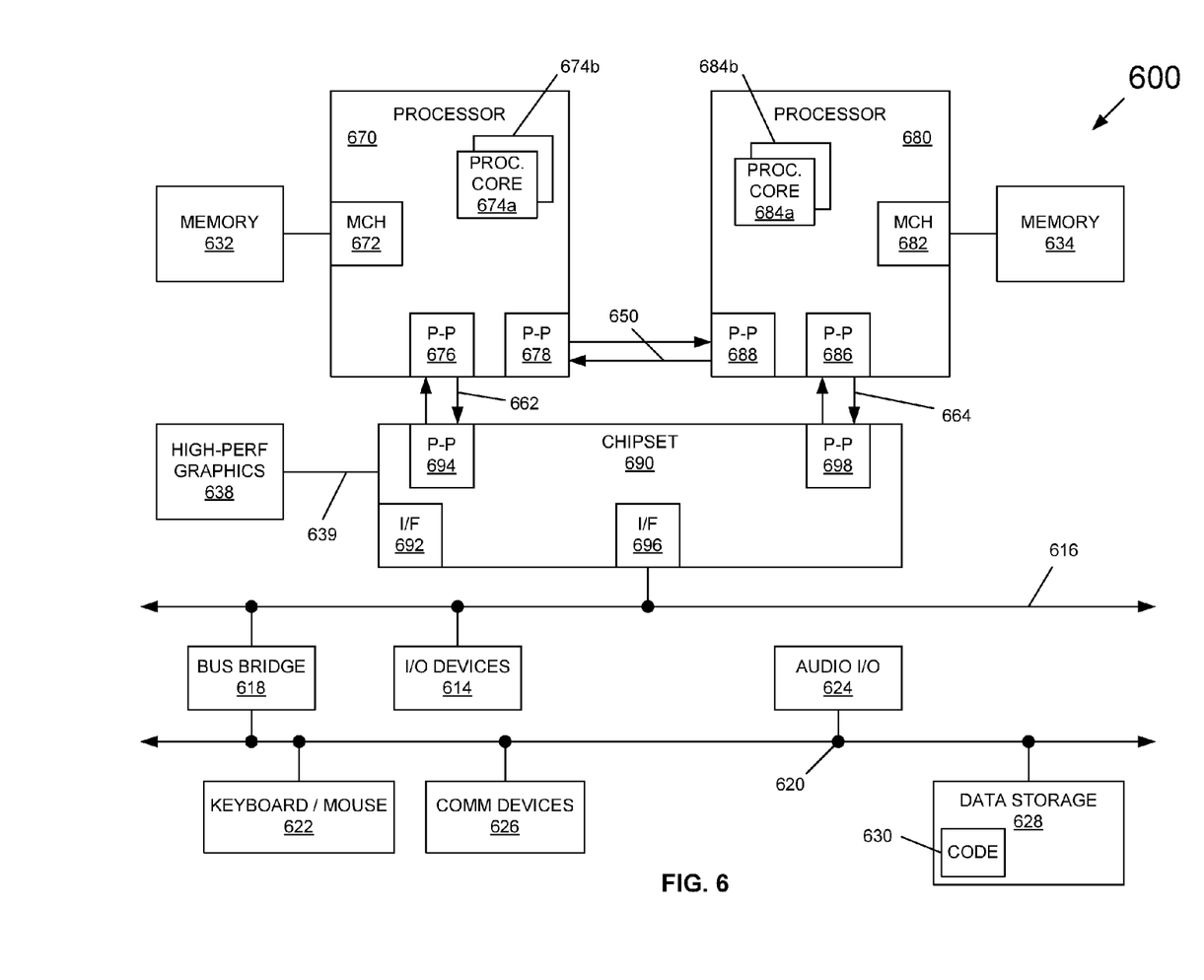
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform the dynamic peak power delivery control and allocation described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of domains including a core domain having at least one core to execute instructions;
a power cost table to store a plurality of entries, each entry associating a leakage power level, a first dynamic power level and a second dynamic power level with one of the plurality of domains for a given frequency of operation; and
a power controller to control power consumption of the processor, the power controller including a first logic to receive an indication of a priority domain of the plurality of domains and to dynamically allocate power to the plurality of domains based on a power limit, one or more maximum domain frequency requests, and the priority domain indication, wherein the first logic is to determine a power demand for a first operating level of the core domain based on a first number of cores at a peak demand level corresponding to the first dynamic power level, a second number of cores at an active demand level corresponding to the second dynamic power level, and a third number of cores at a leakage demand level corresponding to the leakage power level.

2. The processor of claim 1, wherein the power controller is to first dynamically allocate a first portion of the power limit to the plurality of domains to enable each of the plurality of domains to operate at a minimum operating level.

3. The processor of claim 2, wherein the power controller is to second dynamically allocate at least part of a remaining portion of the power limit to the priority domain.

4. The processor of claim 3, wherein the power controller is to third dynamically allocate a remainder of the remaining portion of the power limit to at least another of the plurality of domains.

5. The processor of claim 3, wherein the first logic is to perform a binary search bounded by minimum and maximum frequency values for the priority domain to determine a maximum operating level for the priority domain based on the at least part of the remaining portion of the power limit.

6. The processor of claim 5, wherein the first logic is to further determine the maximum operating level based on a bias value to indicate a bias between the core domain and a graphics domain including at least one graphics engine to perform graphics operations.

7. The processor of claim 5, wherein the power controller is to clip an operating request for the priority domain from a software agent to a minimum of the maximum operating level and the operating request.

8. The processor of claim 1, wherein the first logic is to further determine the power demand based on an entry in the power cost table.

9. The processor of claim 1, wherein the first logic is to perform the dynamic allocation based at least in part on the power demand.

10. The processor of claim 1, further comprising a configuration storage to store the power limit, wherein the power limit is dynamically updatable by a software entity.

11. The processor of claim 10, further comprising a second configuration storage to store the priority domain indicator, wherein the priority domain indicator is dynamically updateable by the software entity.

12. A non-transitory machine-readable medium having stored thereon instructions, which if performed by a machine cause the machine to perform a method comprising:
receiving a request to update a frequency of a first domain of a multi-domain processor;
calculating a minimum power demand for a plurality of domains of the multi-domain processor, including for a core domain, determining a first number of cores at a peak demand level, a second number of cores at an active demand level, and a third number of cores at a leakage demand level, and applying a corresponding level from an entry of a power allocation table to each of the first, second and third number of cores, the power allocation table to store a plurality of entries, each entry associating the leakage demand level, the peak demand level and the active demand level with one of the plurality of domains for a given frequency of operation, and allocating the minimum power demand to each of the plurality of domains;
determining if a portion of a power budget remains after the minimum power demand allocation; and
if so, allocating at least part of the remaining power budget to a priority of the plurality of domains.

13. The non-transitory machine-readable medium of claim 12, wherein allocating the at least part of the remaining power budget comprises performing a binary search to determine a maximum operating frequency for the priority domain.

14. The non-transitory machine-readable medium of claim 13, wherein the method further comprises allocating another part of the remaining power budget to at least another of the plurality of domains.

15. A system comprising:
A multi-domain processor having a plurality of domains including a core domain having at least one core to execute instructions, the multi-domain processor further including a power allocation table including a plurality of entries each to store, for a frequency and a voltage, a leakage power level, a first dynamic power level and a second dynamic power level, and a power allocation logic to receive a request to update a frequency of the core domain, calculate a minimum power demand for the plurality of domains and allocate a minimum power level to each of the plurality of domains, and allocate at least part of a remaining power budget to the core domain, wherein the power allocation logic is to determine a power demand for a first operating level of the core domain based on a first number of cores at a peak demand level corresponding to the first dynamic power level, a second number of cores at an active demand level corresponding to the second dynamic power level, and a third number of cores at a leakage demand level corresponding to the leakage power level; and
a dynamic random access memory (DRAM) coupled to the multi-domain processor.

16. The system of claim 15, wherein the power allocation logic is to first dynamically allocate a first portion of the power budget to the plurality of domains to enable each of the plurality of domains to operate at a minimum performance level.

17. The system of claim 16, wherein the power allocation logic is to second dynamically allocate the at least part of the remaining power budget to the core domain, and third dynamically allocate a remainder of the remaining power budget to a graphics domain including at least one graphics engine to perform graphics operations.

18. The system of claim 15, wherein the multi-domain processor is to update the power allocation table when a temperature of the multi-domain processor changes by a threshold amount.

* * * * *